United States Patent [19]
Seith

[11] Patent Number: 6,165,096
[45] Date of Patent: *Dec. 26, 2000

[54] SELF-SHIFTING TRANSMISSION APPARATUS

[75] Inventor: Warren A. Seith, Bethlehem, Pa.

[73] Assignee: Ingersoll-Rand Company, Woodcliff Lake, N.J.

[*] Notice: This patent is subject to a terminal disclaimer.

[21] Appl. No.: 09/267,316

[22] Filed: Mar. 12, 1999

[51] Int. Cl.[7] .............................. F16H 35/10; F16H 3/74; F16H 3/44
[52] U.S. Cl. ........................... 475/265; 475/259; 475/290
[58] Field of Search ...................... 475/257, 258, 475/259, 290, 265, 260–264; 173/178, 176, 216–218; 81/54; 192/105 BA

[56] References Cited

U.S. PATENT DOCUMENTS

| | | | |
|---|---|---|---|
| 3,319,494 | 5/1967 | Ulbing | 74/812 |
| 3,529,513 | 9/1970 | Amtsberg | 91/411 |
| 3,586,115 | 6/1971 | Amtsberg | 173/163 |
| 3,696,871 | 10/1972 | Stenbacka | 173/12 |
| 3,739,659 | 6/1973 | Workman, Jr. | 74/751 |
| 3,960,035 | 6/1976 | Workman, Jr. et al. | 74/785 |
| 4,040,311 | 8/1977 | Page, Jr. et al. | 74/750 R |
| 4,057,113 | 11/1977 | Paule et al. | 173/12 |
| 4,147,219 | 4/1979 | Wallace | 173/12 |
| 4,215,594 | 8/1980 | Workman, Jr. et al. | 74/751 |
| 4,243,129 | 1/1981 | Schoeps | 192/56 C |
| 4,270,411 | 6/1981 | Pengo et al. | 74/752 E |
| 4,328,871 | 5/1982 | Gluskin | 173/12 |
| 4,411,173 | 10/1983 | Mixer | 74/785 |
| 4,597,453 | 7/1986 | Kilmer et al. | 176/171 |
| 4,729,260 | 3/1988 | Dudden | 74/752 B |
| 4,875,528 | 10/1989 | Thackston | 173/12 |
| 4,881,435 | 11/1989 | Hansson | 81/469 |
| 4,883,130 | 11/1989 | Dixon | 173/12 |
| 4,919,022 | 4/1990 | Ono et al. | 81/464 |
| 4,966,057 | 10/1990 | Koppatsch | 81/469 |
| 5,011,464 | 4/1991 | White | 475/260 |
| 5,076,120 | 12/1991 | Lin | 81/54 |
| 5,203,242 | 4/1993 | Hansson | 81/469 |
| 5,263,906 | 11/1993 | Antonov | 475/257 |
| 5,337,638 | 8/1994 | Coss et al. | 81/483 |
| 5,505,676 | 4/1996 | Bookshar | 477/178 |
| 5,514,044 | 5/1996 | Antonov | 475/257 |
| 5,538,089 | 7/1996 | Sanford | 173/2 |
| 5,550,416 | 8/1996 | Fanchang et al. | 173/216 X |
| 5,569,118 | 10/1996 | Holmin | 477/178 |
| 5,655,984 | 8/1997 | Antonov | 475/140 |
| 5,692,575 | 12/1997 | Hellstrom | 173/216 |
| 5,730,232 | 3/1998 | Mixer | 173/176 |
| 5,897,454 | 4/1999 | Cannaliato | 475/265 |
| 5,954,144 | 9/1999 | Thames | 173/216 |
| 5,967,243 | 10/1999 | Jacobsson | 173/216 |

*Primary Examiner*—Charles A Marmor
*Assistant Examiner*—Roger Pang
*Attorney, Agent, or Firm*—Leon Nigohosian, Jr.

[57] ABSTRACT

A self-shifting transmission apparatus having a rotational drive and a rotational output spindle. A first transmission gear and an overrunning clutch are rotatably connected in series between the rotational drive and the rotational output spindle. A centrifugal clutch is rotatably connected in series between the rotational drive and the rotational output spindle. The centrifugal clutch is rotatably connected to a shaft which rotates in the overrunning clutch such that upon the drive rotating at and above a predetermined rotational speed, the centrifugal clutch engages to rotate the output spindle while rotating the shaft to overrun within the overrunning clutch. Upon the drive rotating below the predetermined rotational speed, the centrifugal clutch disengages thereby permitting the overrunning clutch to engage the shaft and rotate the output spindle through the first transmission gear.

16 Claims, 10 Drawing Sheets

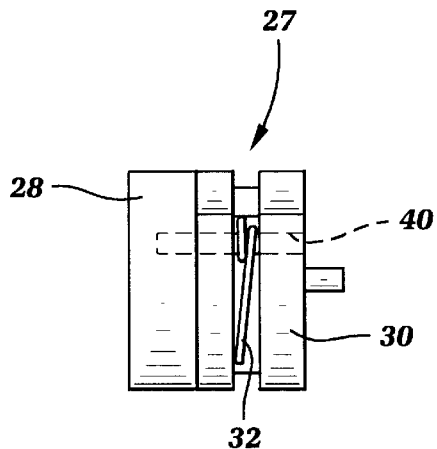
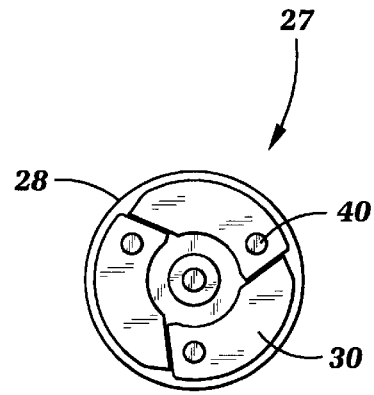
Fig. 3A    Fig. 3B
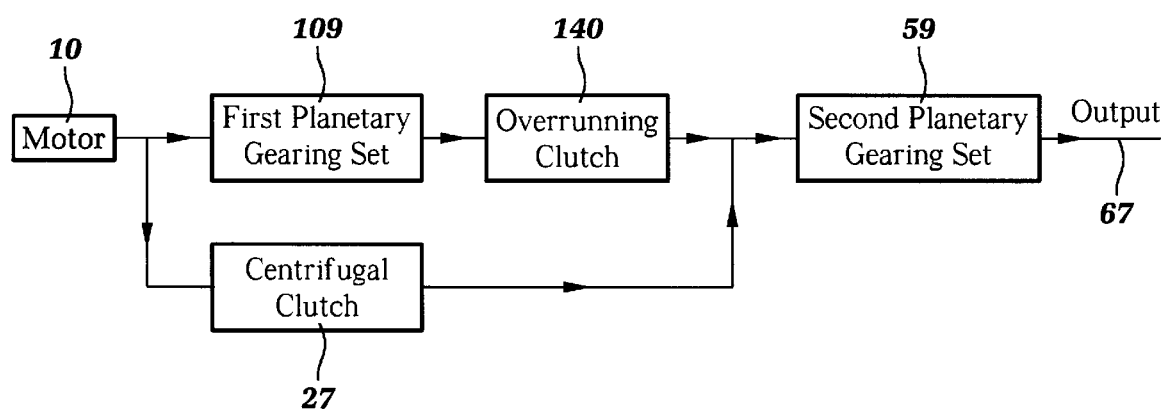
Fig. 4

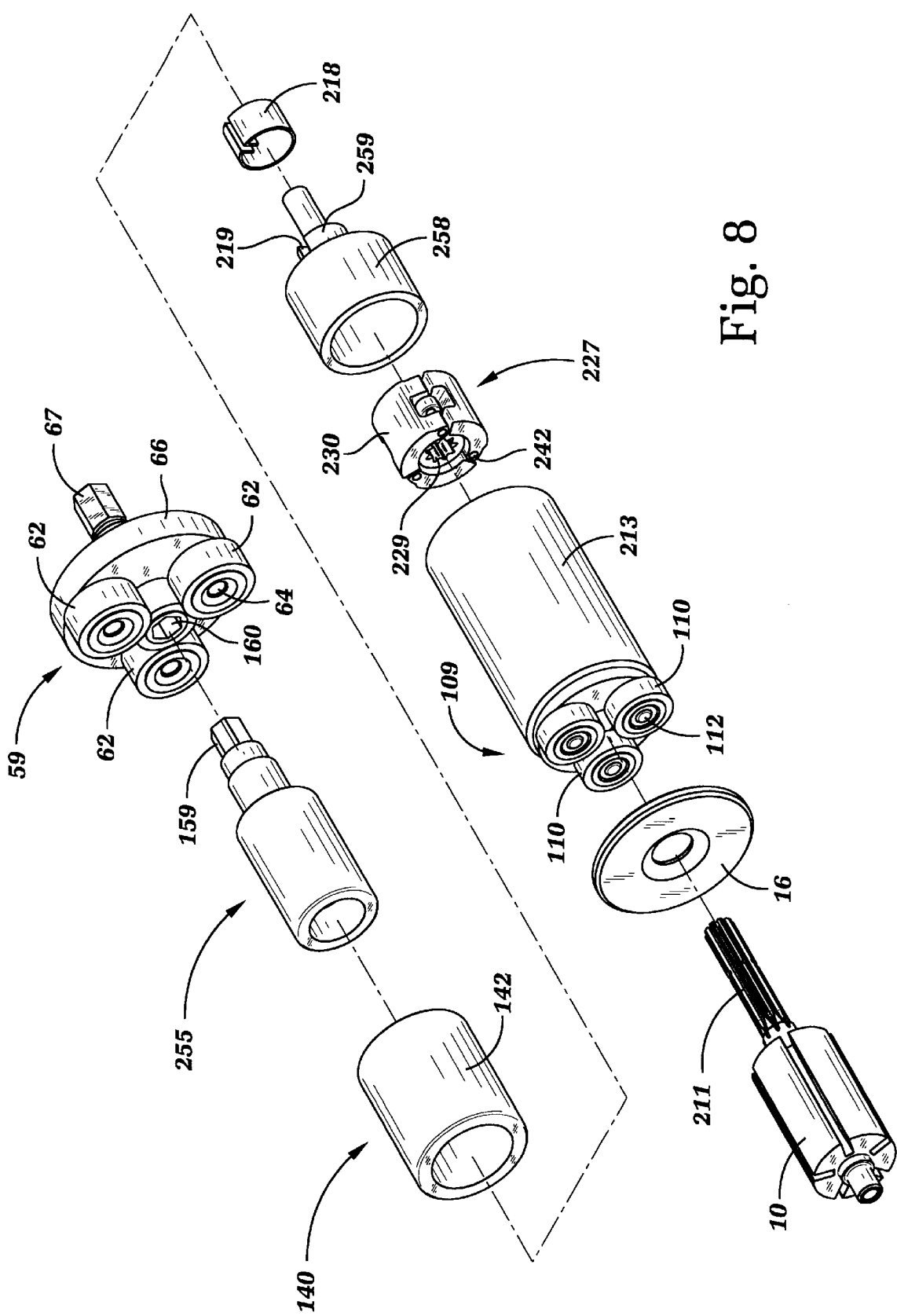

SELF-SHIFTING TRANSMISSION APPARATUS

The present invention relates to the art of transmission devices and, more particularly, to driving tools incorporating the same.

In installing threaded fasteners such as bolts, nuts, and the like it is often required that the bolt or nut be rotated at a relatively low torque for numerous revolutions until mating is accomplished. Thereafter, the bolt or nut must be rotated a small number of revolutions at progressively higher torque until the final installed torque is reached.

Because installing threaded fasteners is a labor-intensive process, it is desirable to reduce the overall time required to run down and tighten a fastener. By using a fastening tool that has high output speed, a fastener can be run down quickly, however, the fastening tool will not develop torque sufficient to tighten the fastener. Conversely, a fastening tool geared to generate high torque will sufficiently tighten a fastener but will have a low output speed and can take a long time to run down the fastener. As can be appreciated, in the latter case the low torque running time is lost, non-productive time in the operation cycle. Thus, there is a trade off between speed and torque. Although using larger motors will help to develop higher torque at higher speed, these larger motors suffer from the inherent drawbacks of increased weight and increased air consumption.

Various prior art devices and tools have been proposed to allow the low torque operation to be at high speed while the final high torque operation is at a somewhat lower speed. These prior art devices have been less than adequate and suffer from a variety of drawbacks. Accordingly there is a need for an improved and more efficient fastener driving tool which can run at high speed during low torque output and then run at a low speed and high torque output until the desired final torque level is reached.

The foregoing illustrates limitations known to exist in present two-speed devices. Thus it is apparent that it would be advantageous to provide an alternative directed to overcoming one or more of the limitations set forth above. Accordingly an alternative self-shifting transmission is provided including the features more fully disclosed hereinafter.

SUMMARY OF THE INVENTION

According to the present invention, a self-shifting transmission apparatus is provided having a rotational drive and a rotational output spindle. A first transmission gear and an overrunning clutch are rotatably connected in series between the rotational drive and the rotational output spindle. A centrifugal clutch is rotatably connected in series between the rotational drive and the rotational output spindle. The centrifugal clutch is rotatably connected to a shaft which rotates in the overrunning clutch such that upon the drive rotating at and above a predetermined rotational speed, the centrifugal clutch engages to rotate the output spindle while rotating the shaft to overrun within the overrunning clutch. Upon the drive rotating below the predetermined rotational speed, the centrifugal clutch disengages thereby permitting the overrunning clutch to engage the shaft and rotate the output spindle through the first transmission gear.

The foregoing and other aspects will become apparent from the following detailed description of the invention when considered in conjunction with accompanying drawing figures.

BRIEF DESCRIPTION OF THE DRAWINGS

FIG. 3A is a side view of a centrifugal clutch assembly shown in FIGS. 1 and 2;

FIG. 3B is a front view of a centrifugal clutch assembly viewed along the plane designated by sectional line 3B—3B shown in FIG. 1;

FIG. 4 is a block diagram which schematically illustrates the operation of the self-shifting transmission apparatus shown in FIGS. 1 and 2;

FIG. 8 is an exploded view of the self-shifting transmission apparatus of FIG. 7;

DETAILED DESCRIPTION OF THE PREFERRED EMBODIMENTS

Figure 1:
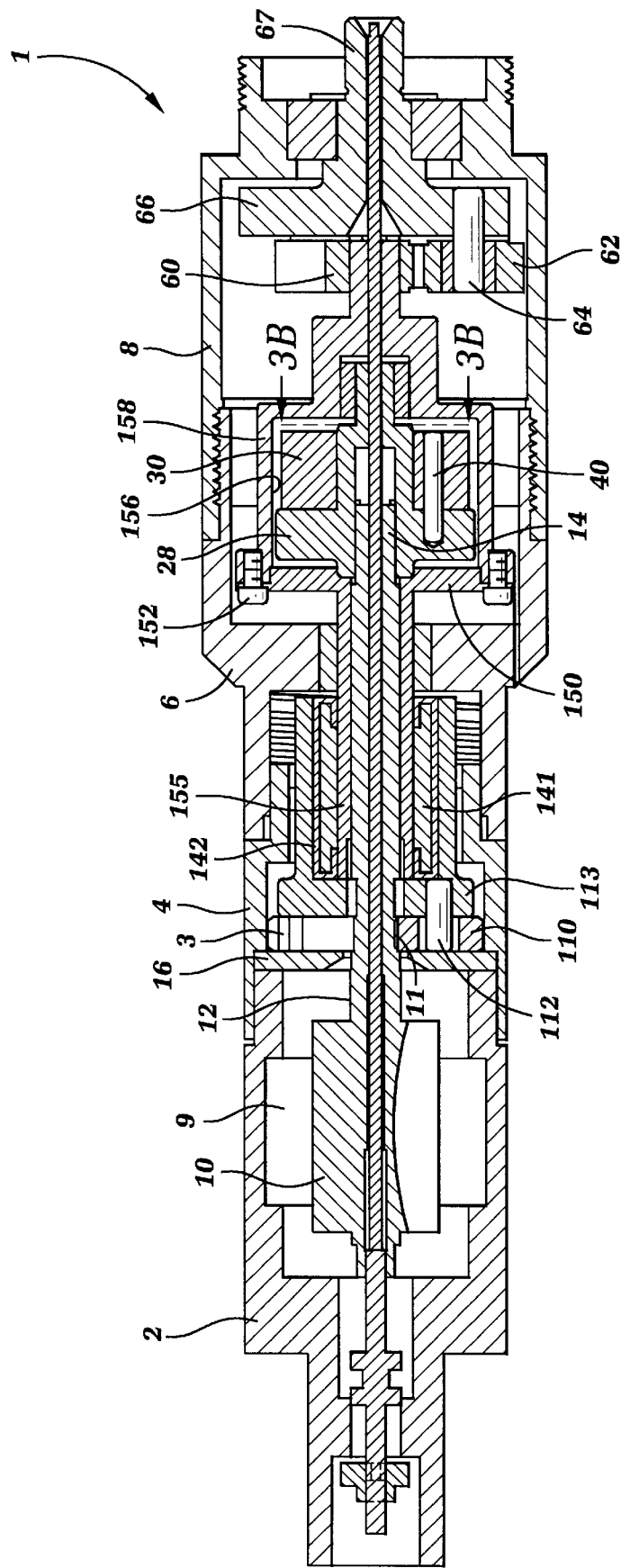
FIG. 1 is a cross-sectional view of a self-shifting transmission apparatus according to the present invention.

The invention is best understood by reference to the accompanying drawings in which like reference numbers refer to like parts. It is emphasized that, according to common practice, the various dimensions of the transmission and the fastening tools shown in the drawings are not to scale and have been enlarged for clarity.

Referring now to the drawings, shown in FIG. 1 is a self-shifting transmission apparatus according to the present invention having an elongated housing 1 defined by means of a succession of sections 2, 4, 6, 8 fixed to one another in end-to-end relation. A rotor chamber wall insert 16 having a through-hole 17 is provided between housing sections 2 and 4 to define a motor chamber 9 in housing section 2. The particular type of motor provided is not important to the invention and could be any conventional pneumatic, hydraulic, or electric motor. In the subject embodiment shown, a conventional air-driven rotary motor 10 of the radially slidable vane type is arranged within motor chamber 9 and is connected to a drive shaft 12 which passes axially through through-hole 17 of wall insert 16, through housing sections 4 and 6, and terminates in a male hex end 14. Drive shaft 12 is connected to a centrifugal clutch plate 28 through a hex joint created between male hex end 14 and a female hex 15 located in centrifugal clutch plate 28.

Along drive shaft 12, in order, between wall insert 16 and centrifugal clutch plate 28 are disposed a first planetary gearing set 109, an overrunning clutch 140, and a drum shaft 155 which is connected to or integral with a cover plate 150.

First planetary gearing set 109 is comprised of planet gears 110, which typically are three in number and are rotatably mounted to an output carrier 113 via three drive pins 112 as shown. The rotary motor 10 is connected to first planetary gearing set 109 which meshes with a spline 11 located on the drive shaft 12 and a ring gear 3 located on the interior of housing section 4. Preferably spline 11 is integrally machined on to drive shaft 12 but may be provided as a separate sun gear attached thereto. An overrunning clutch 140 having a shell 142 is located within and connected to output carrier 113 as shown in FIG. 1. Preferably overrunning clutch 140 is connected to output carrier 113 by press-fitting shell 142 therein. Overrunning clutch 140 is a directional clutch which may be of the sprag-type comprising a plurality of wedges or sprags 141 arranged in an annular space defined by shell 142. Overrunning clutch 140 is concentrically located around drum shaft 155 and permits drum shaft 155 and output carrier 113 to run freely relative to one another by slipping in one rotational direction while locking them together in the other rotational direction. Overrunning clutch 140 is configured such that upon viewing along the longitudinal axis from the left in FIG. 2, drum shaft 155 is permitted to overrun freely in the clockwise rotational direction but is locked together with drum shaft 155 in the reverse direction. Overrunning clutches useful in the present invention and their operation are known in the art. Examples of such overrunning clutches are those manufactured by The Torrington Company, Torrington, Conn.; the Formsprag Company, Warren, Mich.; or by the INA Bearing Co., Fort Mills, S.C. (as shell type roller clutch Model No. HFLZ 061014).

Drum shaft 155 and connected cover plate 150 are attached to a flange 157 of a drum 158, preferably, by cap screws 152. Located within drum 158 is a centrifugal clutch assembly 27 which comprises three driving clutch shoes 30 which are each attached to centrifugal clutch plate 28 by clutch pins 40 which are inserted into pin holes 42 as shown in FIGS. 1, 2, 3A, and 3B. As shown best in FIG. 3A, springs 32 are attached to each clutch shoe 30 to maintain the shoes in the retracted position shown in FIG. 3B to help reduce wear of the clutch shoes when they are not engaged. Centrifugal clutches which may be used to construct the present invention are available from T. B. Woods, Inc., San Marcos, Tex.

A second planetary gearing set 59 is provided which comprises planet gears 62 which typically are three in number and are rotatably mounted to an output carrier 66 via three drive pins 64 as shown. Planet gears 62 mesh with a sun gear 60 having a female hex socket 160 for receiving a male hex 159 provided on drum 158. Output carrier 66 terminates in a hexagonal driving connection 67 for attachment to a socket of a nut runner or other assembly tool (not shown).

Operation of the self-shifting transmission apparatus according to a first embodiment of the present invention will be described with respect to the centrifugal clutch and overrunning clutch assembly shown in FIGS. 1 and 2 when incorporated into an assembly fastening tool.

HIGH SPEED/LOW TORQUE OPERATION

When used during the run down phase of a fastening cycle, because a low torque is required to run down a nut, a high rotational speed may be achieved by the motor 10 to rotate drive shaft 12. This, in turn, rotates centrifugal clutch plate 28 at a high rate of revolution, typically at approximately 16,000 RPM. Upon rotating centrifugal clutch plate 28 in a clockwise direction about the orientation shown in FIG. 3B, clutch shoes 30 are caused to rotate by clutch pins 40. As the speed of rotation increases, the centrifugal force exerted by rotating clutch shoes 30 cause them to rotate about clutch pins 40 and move radially outward against the force exerted by springs 32. Upon reaching a predetermined rotational speed, clutch shoes 30 engage the interior surface 156 of drum 158 to transmit the driving torque applied to centrifugal clutch plate 28 to drum 158. The rotational speed at which clutch shoes 30 engage drum 158 may be modified by varying the weight of the clutch shoes 30, the spring load of spring 32, or the radius between the clutch shoes 30 and the longitudinal axis of clutch plate 28. The rotation of drum 158 drives hexagonal driving connection 67 via male hex 159 and, in turn, second planetary gearing set 59. Preferably, for an assembly tool the second planetary gearing set 59 is configured to produce a 4.4:1 reduction ratio to produce a rotational tool speed generated by driving connection 67 of approximately 3640 RPM. During this high-speed, run down phase of the fastening cycle, the overrunning clutch 140 is caused to rotate in turn by spline 11 and first planetary gearing set 109, but slips relative to drum shaft 155 thereby allowing torque input to be provided directly to the second planetary gearing set 59 to produce these higher output speeds.

SHIFT FROM HIGH SPEED TO LOW SPEED

The foregoing operation is used to run down a nut at high speed until the torque load created by tightening of the fastener increases thereby causing drive shaft 12 to slow down. This lower rotational speed, in turn, causes clutch shoes 30 to retract and disengage from drum 158. overrunning clutch 140, which is driven to rotate in a clockwise direction by spline 11 and first planetary gearing set 109, prevents drum shaft 155 from decelerating below the rotational speed of the overrunning clutch by locking onto the drum shaft. At these lower rotational speeds of drive shaft 12, the overrunning clutch 140 drives drum shaft 155 at the reduction ratio caused by the first planetary gearing set 109, which preferably is 6.67:1.

LOW SPEED/HIGH TORQUE OPERATION

Torque is then transmitted in similar fashion as described above, by drum shaft 155 which rotates drum 158 which drives hexagonal driving connection 67 via male hex 159 and, in turn, second planetary gearing set 59. Because the first planetary gearing set 109 is now driving the second planetary gearing set 59, the total reduction ratio is the product of their individual reduction ratios. Thus, for the preferred embodiment described above, a total reduction ratio of 29.35:1 is achieved to produce a rotational tool speed generated by driving connection 67 of under approximately 545 RPM. During this low speed, high torque tightening phase of the fastening cycle, the centrifugal clutch plate 28 and clutch shoes 30 attached thereto are caused to rotate within drum 158 but do not impart any torque to drum 158 because clutch shoes 30 are disengaged.

Shown schematically in the block diagram of FIG. 4 is the operation of the centrifugal clutch/overrunning clutch combination according to the present invention. As can be seen from the diagram, there are two alternative paths torque can take to get from the motor 10 to the second planetary gearing set 59. The first path is directly to the second planetary gearing set 59 via the centrifugal clutch 27 which is engaged at high rotational speeds to bypass the first planetary gearing set 109. Below the predetermined rotational speed at which the centrifugal clutch 27 is engaged, torque is transmitted through the first planetary gearing set 109 via overrunning clutch 140 to deliver a higher torque at a lower rotational speed to the second planetary gearing set 59. As described above, the rotational speed at which clutch shoes 30 engage drum 158 (and with it the torque output which corresponds to this speed as described below) may be modified by varying the weight of the clutch shoes 30, the spring load of spring 32, or the radius between the clutch shoes 30 and the longitudinal axis of clutch plate 28.

Thus, according to the present invention a self-shifting transmission is provided which, by incorporating the combination of a centrifugal clutch and an overrunning clutch, permits a motor to provide high rotational speed when high torque is not required and automatically shift into low gear when high torque is required. The self-shifting transmission according to the present invention is advantageous over other conventional two-speed transmissions, which utilize apparatus to directly sense torque and cause a gear shift when a threshold torque is exceeded. Such conventional two-speed transmissions typically are complicated, require many parts, and typically use larger and/or multiple motors. Unlike these conventional designs, the centrifugal clutch/overrunning clutch combination according to the present invention utilizes the torque versus speed relationship of a motor to indirectly detect the torque being transmitted by a motor and shift between two-speeds. Although shown and described throughout as being a self-shifting transmission which shifts between two-speeds, it will be readily recognized by those skilled in the art that automatic shifting between any number of speeds may be accomplished by coupling two or more of the self-shifting apparatus together in series.

The shifting of the self-shifting transmission based on rotational speed according to the present invention will be described with respect to an assembly tool shown in FIG. 5 having a right angle fastening coupling 20. Fastening coupling 20 is detachably connected to housing section 8 by a collar 21 which threadably engages the flange portion of the housing section 8 as shown. Fastening coupling 20 includes a housing 23 in which a driving shaft 26 is rotatably journalled with driving connection 67. A torque output member or spindle 22 for driving a socket is also rotatably journalled in the housing 23 with its axis extending at a right angle to the axis of driving connection 67. Bevel gears 24 and 25, on driving shaft 26 and spindle 22, respectively, serve to transmit torque from the shaft 26 to the spindle 22 and preferably are configured to provide a reduction ratio of 1.44:1. Although right angle fastening coupling 20 is illustrated as comprising a conventional angle drive having an output spindle 22 for receiving a socket fitting on the free end thereof, any suitable type of torque transmitting connection for releasable driving attachment to a fastener or workpiece, e.g., a screw driver, may be incorporated.

Figure 6:
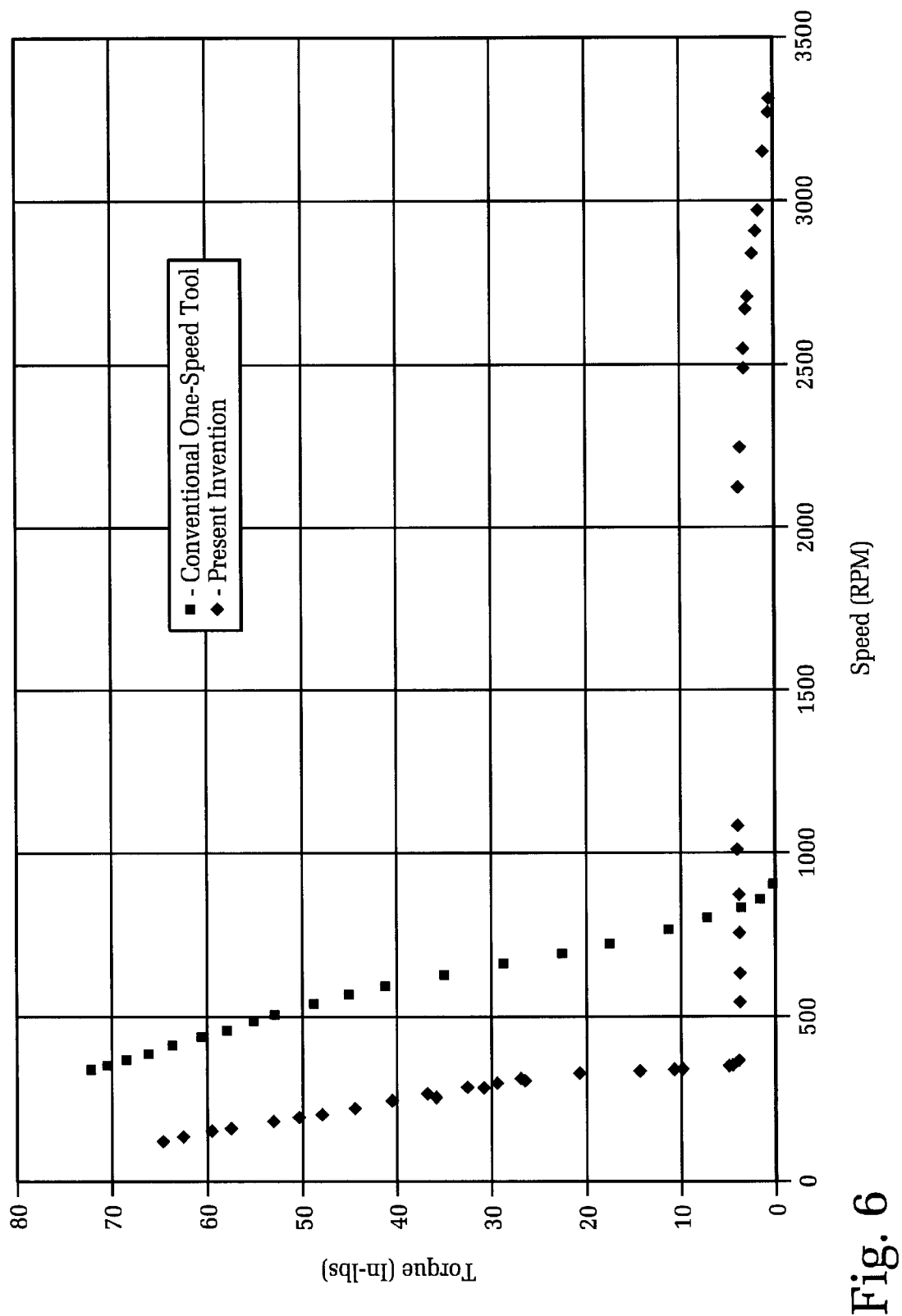
FIG. 6 is a graph of the torque curves for a conventional one-speed direct drive tool having an air motor and for the self-shifting assembly tool shown in FIG. 5 according to the present invention.

Shown in FIG. 6 is a torque curve which illustrates the relationship between torque output and the rotational speed for a conventional one-speed direct drive tool having an air motor. Turning to the graph, as the output torque of a conventional tool reaches a maximum, the rotational speed of the tool decreases to the point at which the motor stalls. Conversely, as the torque output required of the motor decreases, the rotational speed of the motor increases. Thus, a generally linear relationship between output torque and rotational speed is obtained between these two extremes. From this linear relationship, the output torque at any given point may be easily derived by sensing the rotational speed of the motor. The centrifugal clutch/overrunning clutch combination according to the present invention utilizes this torque/speed relationship to detect torque by sensing speed which requires fewer parts than conventional transmissions which detect torque output directly.

Figure 5:
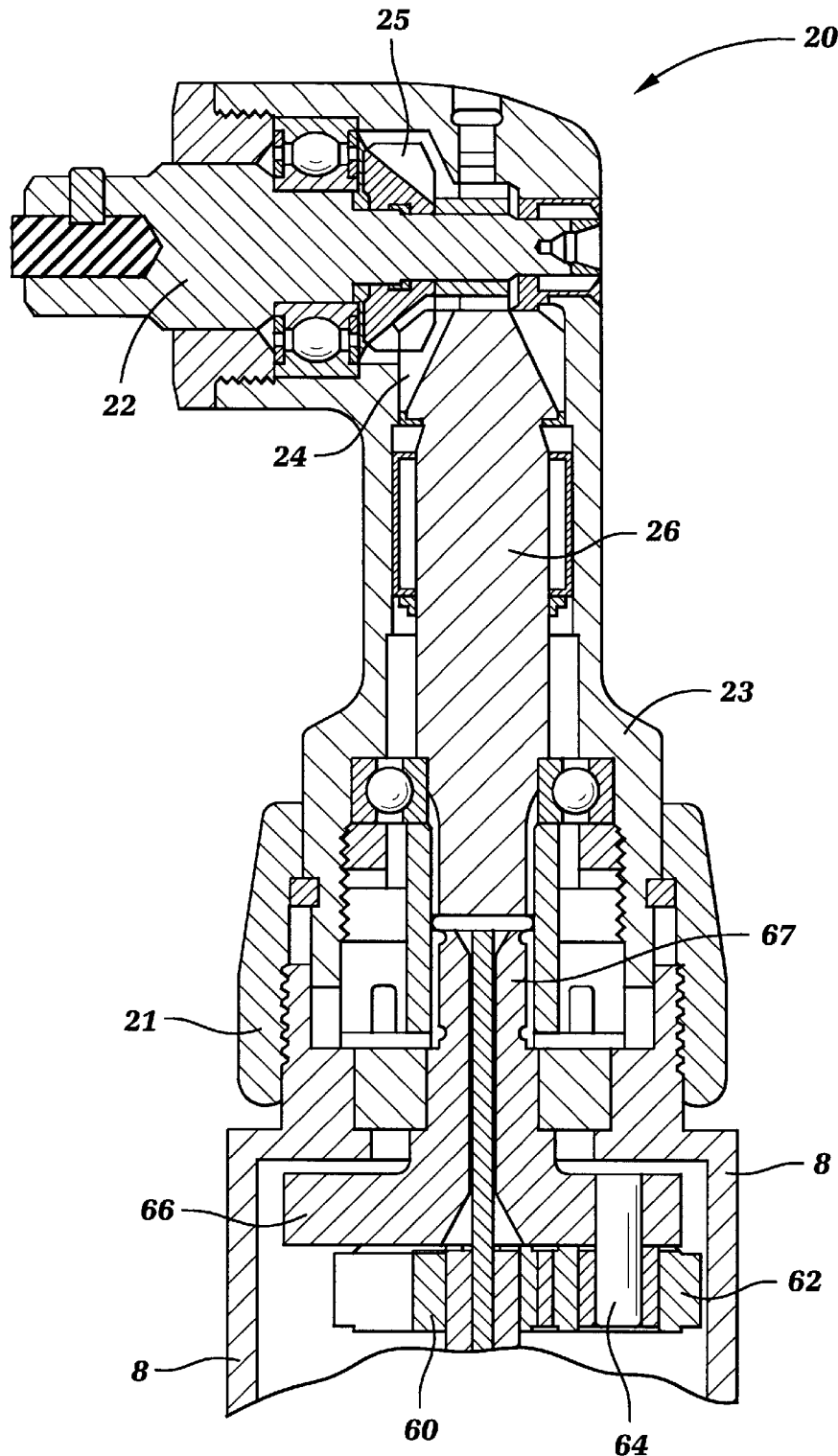
FIG. 5 is a sectional view of a right angle fastening coupling of an assembly tool incorporating a self-shifting transmission apparatus according to the present invention.

Also shown in FIG. 6 is the output torque versus rotational speed for the self-shifting pneumatic assembly fastening tool shown in FIG. 5 which incorporates the centrifugal clutch/overrunning clutch combination according to the present invention with a motor which is one-half the size of the conventional one-speed direct drive tool described above. The free speed of a tool can be identified by the point on the torque/speed curve where it intersects the X-axis on the graph. The tool having the self-shifting transmission according to the present invention is shown to have a free speed of 3300 RPM, which compares favorably to the conventional tool that has a free speed of 900 RPM. The maximum torque capacity for a tool can be identified by the point on the torque/speed curve where it intersects the Y-axis. By extrapolating the curves shown, one can see that the torque capacities of the two tools are comparable, at about 90 in-lbs. Thus, as can be seen upon comparing the torque curves, the self-shifting transmission according to the present invention permits a fastener to be run down at over three times the speed of a conventional one-speed tool without incorporating a motor twice the size, without sacrificing torque. Moreover, to incorporate centrifugal clutch/overrunning clutch combination of the present invention into a conventional tool requires few additional components and may also be used in tools which require a push rod through the center of the drive train, a problem frequently encountered with conventional torque sensing transmissions.

Figure 7:
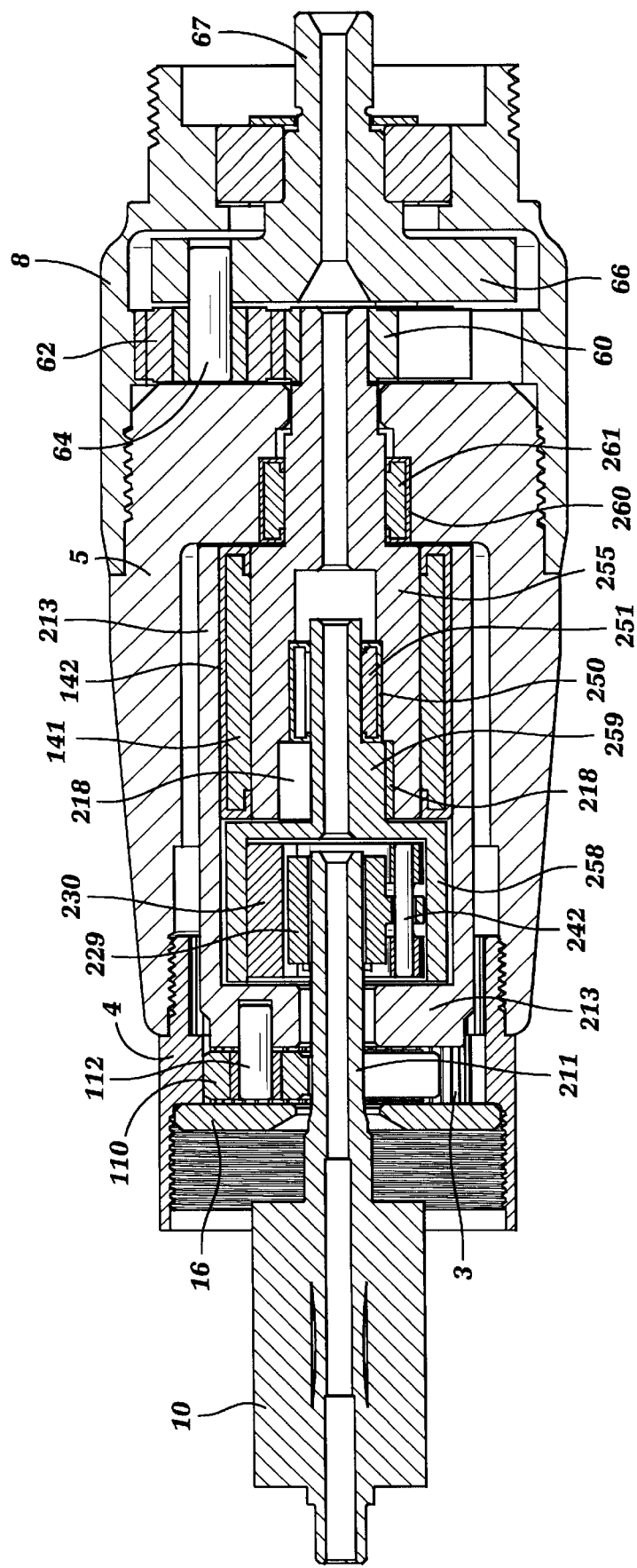
FIG. 7 is a cross-sectional view of a self-shifting transmission apparatus according to an alternative embodiment of the present invention.

Shown in FIGS. 7 and 8 is a self-shifting transmission apparatus and the housing of a fastening tool according to a second embodiment of the present invention that is designed to increase the accuracy of torque delivery. For this purpose, the size and weight of the rotating components have been reduced to decrease the kinetic energy of the high-speed rotating components and a friction or slip clutch has been added to decouple the centrifugal clutch and clutch housing from the output shaft. By helping to reduce the mass and rotational inertia of the component parts as described in greater detail below, these modifications help to increase the accuracy of torque delivery to prevent overtightening of a fastener.

Figure 2:
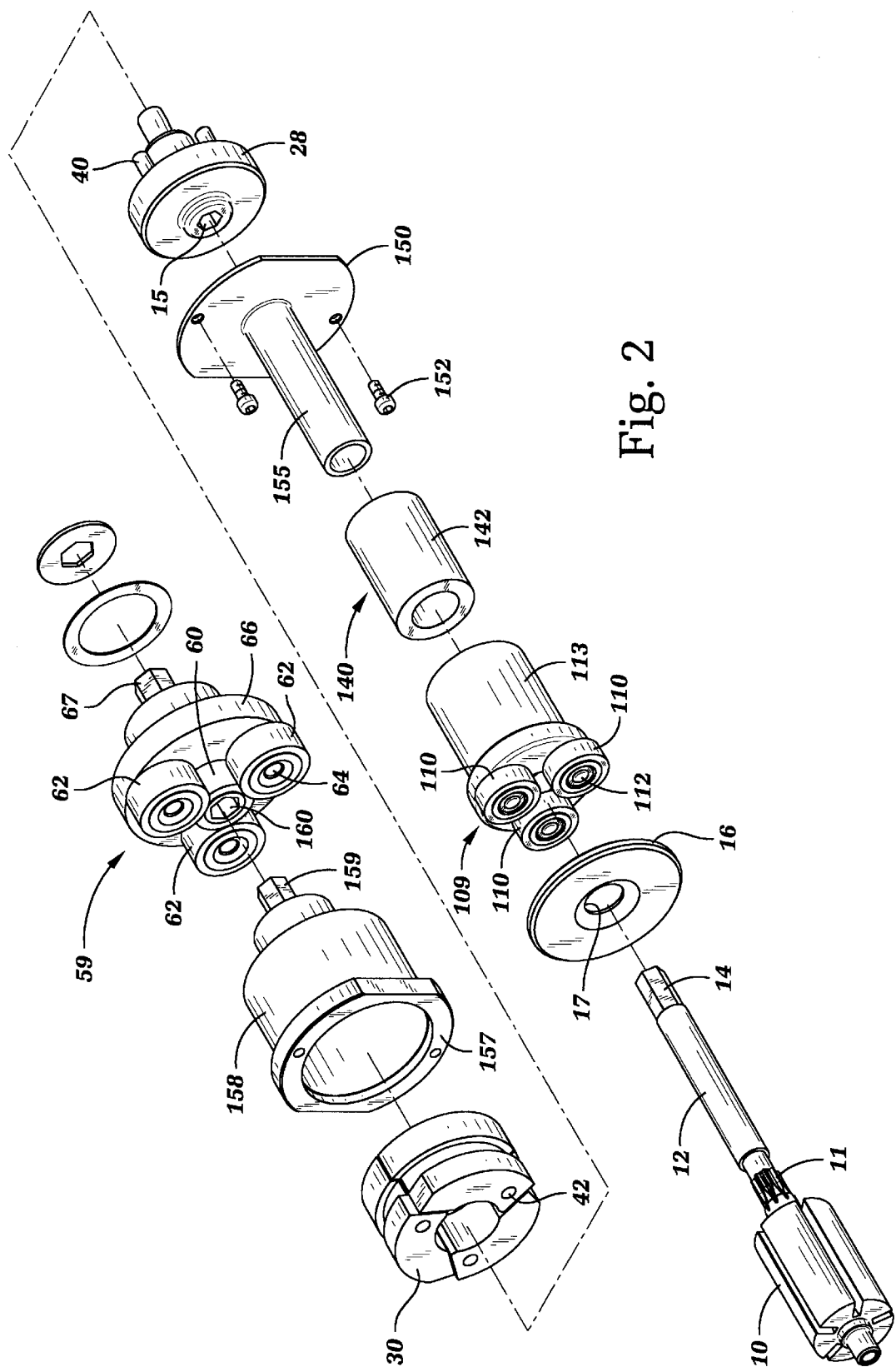
FIG. 2 is an exploded view of the self-shifting transmission apparatus of FIG. 1.
Figure 9A:
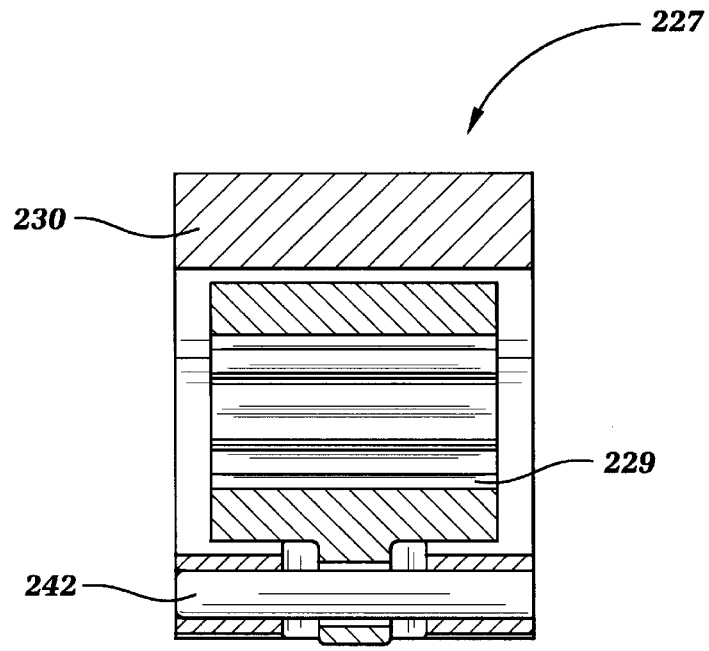
FIG. 9A and 9B are side and front views, respectively, of a centrifugal clutch assembly shown in FIGS. 7 and 8.
Figure 9B:
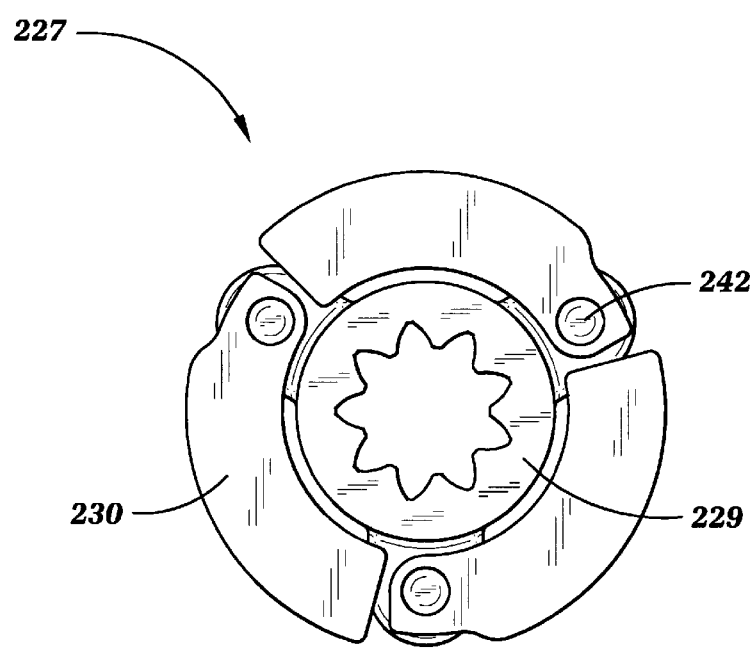

The self-shifting transmission apparatus and fastening tool housing shown in FIGS. 7 and 8 are similar to those shown in FIGS. 1 and 2, but with the following modifications. Output carrier 113 has been replaced by output carrier 213 which is configured to receive both overrunning clutch 140 and a centrifugal clutch 227. Centrifugal clutch 227, best seen in FIGS. 9A and 9B, has clutch pins 242 and clutch shoes 230 like those of centrifugal clutch 27 shown in FIGS. 1–3A and 3B but is also provided with a female gear socket 229 for receiving an elongated spline 211. To help reduce the level of torque required to drive clutch shoes 230 radially outward, the clutch shoes are not spring-biased. Elongated spline 211 replaces spline 11, shaft 12, and male hex end 14. By locating centrifugal clutch 227 internally within the output carrier 213, drum 158 and the associated component parts, namely, flange 157, cover plate 150, centrifugal clutch plate 28, and cap screws 152, may be eliminated and replaced by a cylindrical drum 258 disposed within output carrier 213. Also provided within overrunning clutch 140 is a drum shaft 255 which is provided with male hex 159 and replaces drum shaft 155. As shown in FIG. 7, drum 258 is journalled and rotatably mounted within drum shaft 255 via needle bearing having a shell 250 and needle roller 251 as shown. Drum shaft 255, in turn, is journalled within housing shell 5 via a second needle bearing having a shell 260 and needle roller 261. Drum shaft 255 is also mounted for rotation in one direction within sprags 141 of overrunning clutch 140 which is attached to the interior bore of output carrier 213, preferably by a friction fit.

Figure 10:
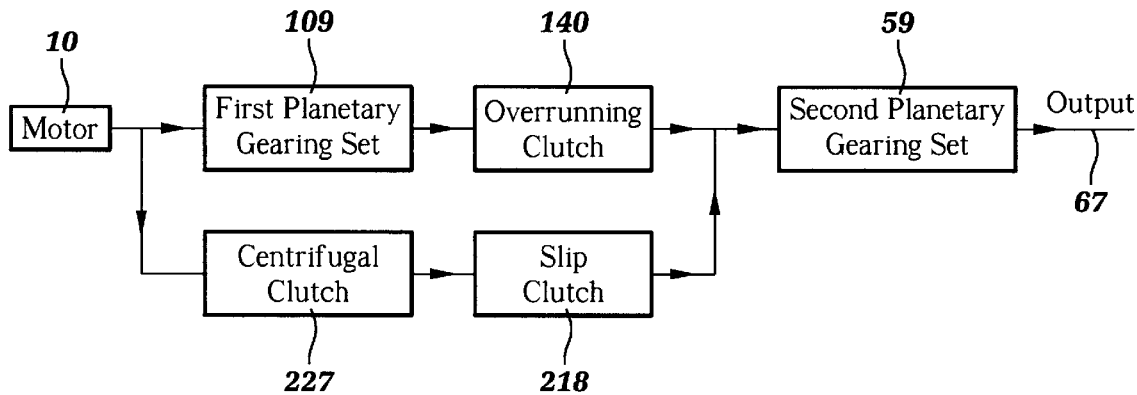
FIG. 10 is a block diagram which schematically illustrates the operation of the self-shifting transmission apparatus shown in FIGS. 7 and 8.

An extended portion 259 which extends from drum 258 is connected through a slip clutch 218 to the inside of drum shaft 255. Through friction applied by slip clutch 218 to drum shaft 255, slip clutch 218 is configured to transfer torque from drum 258 to drum shaft 255 during the high-speed rundown portion of a fastening cycle. Shown schematically in the block diagram of FIG. 10 is the operation of the centrifugal clutch/overrunning clutch combination according to second embodiment the present invention shown in FIGS. 7 and 8. As can be seen from the diagram, like the first embodiment described in detail above there are two alternative paths torque can take to get from the motor to the second planetary gearing set 59. The first path is to the second stage gearing 59 via the centrifugal clutch 227 which engages drum 258 at high rotational speeds to bypass the first planetary gearing set 109. In this high speed/low torque operation, the difference from the first embodiment is that rather than transmitting torque directly to the second planetary gearing set 59 via drum 158, torque from centrifugal clutch 227 is transmitted through slip clutch 218 to drum shaft 255 which, in turn, transfers torque via male hex 159. The foregoing operation is used to run down a nut at high speed until the torque load created by tightening of the fastener increases to the point where slip clutch 218 slips thereby causing the drum shaft 255 to decelerate. As drum shaft 255 decelerates, slip clutch 218 permits centrifugal clutch 227 to rotate within the drum shaft 255 without imparting excessive torque to the drum shaft. In this manner, the torque limiting function of the slip clutch 218 prevents kinetic energy in the drum 258 from being transmitted to the fastener, thereby preventing overtorquing of the fastener.

Overrunning clutch 140, which is driven to rotate in a clockwise direction by elongated spline 211 and first planetary gearing set 109, prevents drum shaft 255 from decelerating below the rotational speed of the overrunning clutch by locking onto the drum shaft. Thus, below the predetermined rotational speed at which the centrifugal clutch 227 and slip clutch 218 are engaged, torque is transmitted through the first planetary gearing set 109 via overrunning clutch 140 to deliver a higher torque at a lower rotational speed to the second planetary gearing set 59. Through this second torque path, a higher torque at lower speed is then transmitted by drum shaft 255 to hexagonal driving connection 67 via second planetary gearing set 59. Because the first planetary gearing set 109 is now driving the second planetary gearing set 59, the total reduction ratio is the product of their individual reduction ratios as discussed in detail above with respect to the first embodiment. As described in detail above with respect to the first embodiment, driving connection 67 may be used to drive a right angle fastening coupling 20 such as that illustrated in FIG. 5.

Preferably, slip clutch 218 is configured to carry two to three times the motor torque so that no slipping will occur during high speed rundown. Preferably, slip clutch 218 is a piece of metal strap spring, preferably of steel, with its ends inserted into key slot 219 located on extended portion 259 of drum 258. The slip clutch is then compressed and pushed into the open end of drum shaft 255. The torque capacity of slip clutch 218 (i.e., the torque at which the slip clutch begins to slip) may be varied by modifying its spring force. As will be recognized by those having ordinary skill in the art, this may be accomplished by varying the dimensions (i.e., the length, width, and/or thickness), the configuration, and/or the material of slip clutch 218.

Although the second embodiment is shown and described above with respect to using a slip clutch, it is understood that this self-shifting transmission may be used without this slip clutch to utilize only the torque control accuracy afforded by only the size and weight reduction in the rotational parts created by the elimination of drum 158 and the associated component parts, namely, flange 157, cover plate 150, centrifugal clutch plate 28, and cap screws 152.

Figure 11:
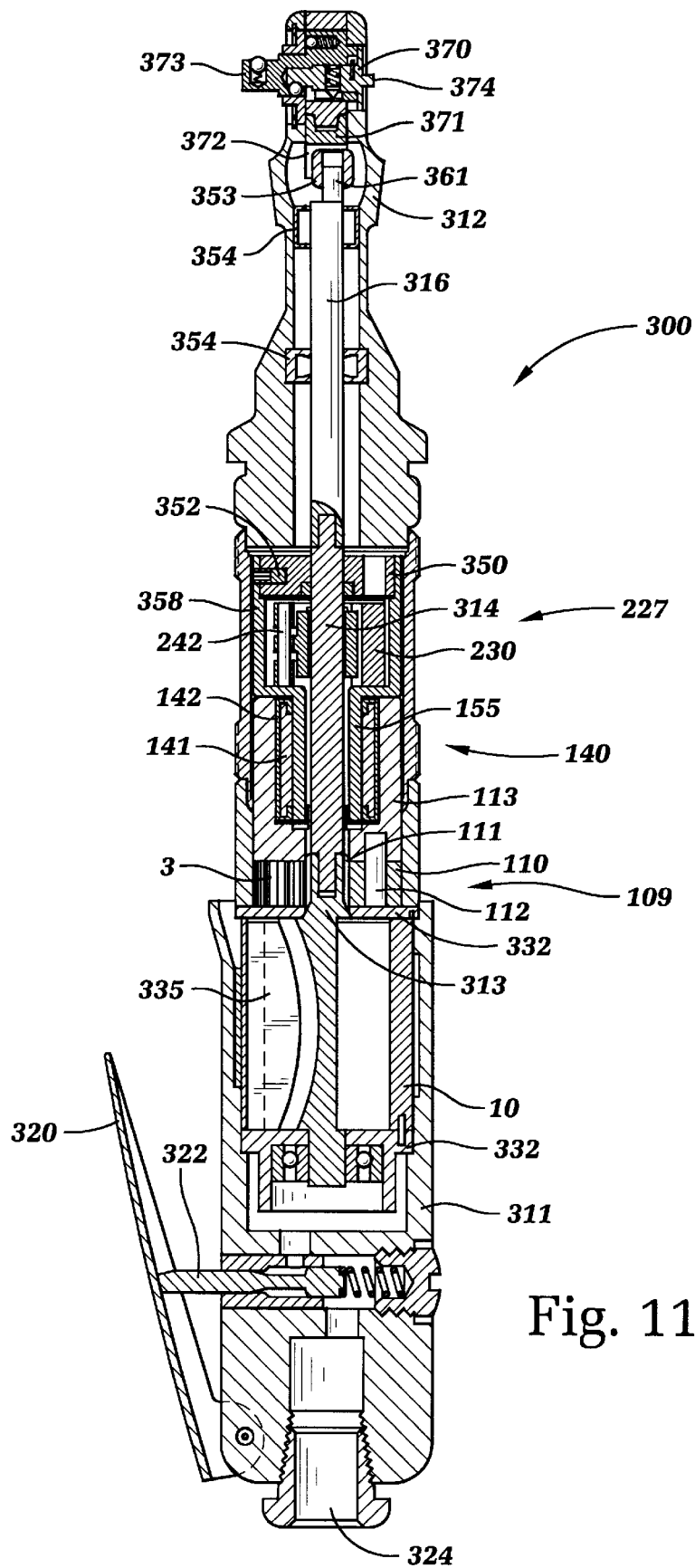
FIG. 11 is a sectional view of a ratchet wrench having a self-shifting transmission apparatus according to the present invention.

Shown in FIG. 11 is a third embodiment of the present invention in which the self-shifting transmission apparatus is incorporated into a ratchet wrench similar to that shown and described in commonly owned U.S. Pat. No. 4,919,022 issued to Ono et al., which patent is incorporated herein by reference. Ratchet wrench 300 has a throttle lever 320 which opens and closes a throttle valve 322. Throttle valve 322 controls air flow to an air inlet 324 of a rotary motor 10 located in a motor housing 311. The rotor is mounted for rotation in a cylinder 335 disposed in the housing 311, with the open ends of the cylinder being covered by end plates 332.

The rotary output of motor 10 is transmitted from an output shaft 313 connected to motor 10, through drive shaft 314, and to driven shaft 316 which is rotatably journalled within roller bearings 354. Drive shaft 314 is rotatably journalled within the self-shifting transmission according to the present invention comprised of a centrifugal clutch 227, an overrunning clutch 140, and a first planetary gearing set 109. As described in detail above, centrifugal clutch 227 has clutch shoes 230 and clutch pins 242. Centrifugal clutch 227 is located within drum 358 having a drum shaft 155 and a cover plate 350. Preferably cover plate 350 is set within drum 358 and attached by a set screw 352 as shown. Overrunning clutch 140 is a directional clutch which may be of the sprag-type comprising a plurality of wedges or sprags 141 arranged in an annular space defined by shell 142. The planetary gearing set 109 is comprised of planet gears 110 that typically are three in number and are rotatably mounted to an output carrier 113 via three drive pins 112 as shown. The rotary motor 10 is connected to planet gears 110 which mesh with a spline 111 located on the output shaft 313 and a ring gear 3.

Eccentric crank 361 is positioned at the end of driven shaft 316 and rotates in the bore of a drive bushing 353. Drive bushing 353 is located and rotates in a bushing pocket 372 of a ratchet housing 312 to cause a ratchet yoke 371 to oscillate. The oscillating movement of ratchet yoke 371 is transferred to the ratchet mechanism 370. The ratchet mechanism rotates a ratchet spindle or tool head 373 in a conventional manner as is well known in the prior art. By turning the ratchet reverse knob 374 to the appropriate setting, the direction of rotation of the ratchet spindle can be determined. The tool can be operated to tighten or remove a fastener by setting the ratchet reverse knob 374.

Operation of the ratchet wrench 300 is by depressing throttle lever 320 which opens throttle valve 322 thereby permitting compressed air to enter air inlet 324 which causes motor 10 and output shaft 313 to rotate. The rotation of output shaft 313 causes drive shaft 314 and driven shaft 315, in turn, to rotate the reversible ratchet mechanism 370 in the desired direction, thus tightening or removing a threaded part or fastener.

Figure 12:
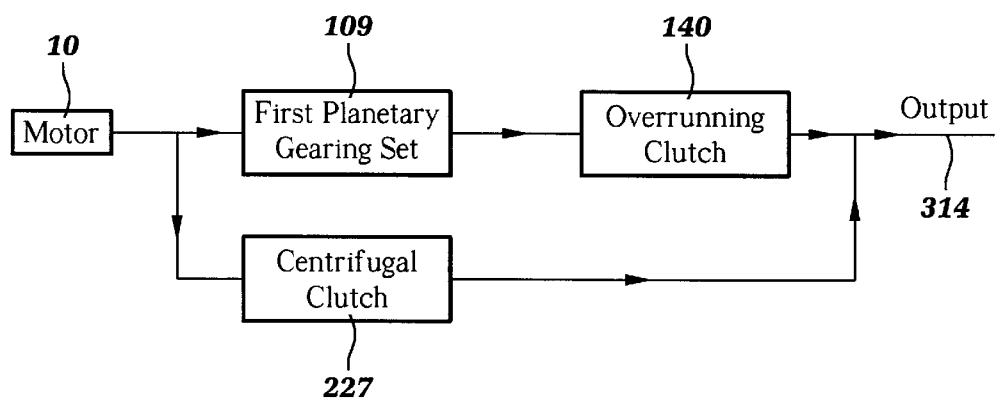
FIG. 12 is a block diagram which schematically illustrates the operation of the self-shifting transmission apparatus in the ratchet wrench shown in FIG. 11.

Shown schematically in the block diagram of FIG. 12 is the operation of the centrifugal clutch/overrunning clutch combination according to the present invention when used in the ratchet wrench described above and shown in FIG. 11. As can be seen from the diagram, there are two alternative paths torque can take to get from the motor to drive shaft 314. The first path is directly to the drive shaft 314 via the centrifugal clutch 227 which is engaged at high rotational speeds to bypass the planetary gearing set 109. Below the predetermined rotational speed at which the centrifugal clutch 227 is engaged, torque is transmitted through the planetary gearing set 109 via overrunning clutch 140 to deliver a higher torque at a lower rotational speed to drive shaft 314. Thus, in operation the self-shifting transmission shown in FIG. 11 operates similar to the self-shifting transmission shown in FIG. 1 except that a second planetary gearing set has been eliminated thereby eliminating the further reduction caused by this second planetary gearing set. It is to be understood that in similar fashion the self-shifting transmission shown in FIG. 7 may alternately be incorporated into the ratchet wrench to accomplish the self-shifting feature described in detail above.

While embodiments and applications of this invention have been shown and described, it will be apparent to those skilled in the art that many more modifications are possible without departing from the inventive concepts herein described. For example, although shown and described above embodied in various fastening tools, it is understood that this is illustrative of only one manner in which the self-shifting transmission may be utilized. Other uses may include any application in which a transmission coupling means (e.g., a planetary reduction gearing set) which normally delivers a high torque from a motor at low rotational speeds is to be bypassed in order to provide a high rotational speed for any reason. For example, bypassing of the transmission coupling means to vary the rotational speed may, for example, be to adjust to a changing load or to provide for the highest rotational speed possible at any point in time. Moreover, this bypassing of the transmission coupling means may be accomplished automatically while using fewer parts than conventional transmissions. Other exemplary applications in which self-shifting transmission may be utilized include but are not limited to transmissions for engines, engine starters, or other machinery driven by any motive force. Moreover, although shown with specific components in specific embodiments above, it will be recognized by those skilled in the art that the various components such as the centrifugal and slip clutches shown may be interchanged between the various embodiments to accomplish the particular advantages described above. For instance, centrifugal clutch assembly 27 described with respect to the first embodiment and having springs 32 attached to each clutch shoe 30 to maintain the shoes in the retracted position may be used in the alternative embodiments described herein to help reduce wear of the clutch shoes when they are not engaged.

It is understood, therefore, that the invention is capable of modification and therefore is not to be limited to the precise details set forth. Rather, various modifications may be made in the details within the scope and range of equivalents of the claims without departing from the spirit of the invention.

What is claimed is:

1. A self-shifting transmission apparatus, comprising:
    a rotational drive shaft and a rotational output spindle;
    a first transmission gear and an overrunning clutch rotatably connected in series between said rotational drive shaft and said rotational output spindle;
    a centrifugal clutch rotatably connected in parallel with said first transmission gear and said overrunning clutch and comprising a cylindrical drum mounted between said shaft and said output spindle with at least one clutch shoe mounted within said cylindrical drum, said centrifugal clutch rotatably connected to a shaft which rotates in said overrunning clutch such that
    upon said rotational drive shaft rotating at and above a predetermined rotational speed, said at least one clutch shoe extends radially outward and engages said cylindrical drum to cause said centrifugal clutch to rotate said output spindle while rotating said shaft to overrun within said overrunning clutch; and
    upon said rotational drive shaft rotating below said predetermined rotational speed, said at least one clutch shoe rotates within said cylindrical drum to disengage said centrifugal clutch thereby permitting said overrunning clutch to engage said shaft and rotate said output spindle through said first transmission gear.

2. The self-shifting transmission apparatus according to claim 1, wherein said first transmission gear is a first planetary gearing set which engages and is rotatably driven by said rotational drive shaft.

3. The self-shifting transmission apparatus according to claim 1, wherein said centrifugal clutch further comprises a centrifugal clutch plate disposed in said cylindrical drum, said centrifugal clutch plate being engaged and driven by said drive and attached to rotatably move said at least one clutch shoe.

4. The self-shifting transmission apparatus according to claim 1, further comprising a second transmission gear rotatably connected in series between said cylindrical drum and said rotational output spindle.

5. The self-shifting transmission apparatus according to claim 4, wherein said second transmission gear is a second planetary gearing set which is attached to and rotatably driven by said cylindrical drum and is attached to and drives said rotational output spindle.

6. The self-shifting transmission apparatus according to claim 1, wherein said overrunning clutch comprises a plurality of sprag rollers which engage and permit overrunning rotation of said shaft in one rotational direction.

7. The self-shifting transmission apparatus according to claim 6, wherein said overrunning clutch further comprises a shell located within and attached to a cylindrical output carrier on which said first transmission gear means is attached, said plurality of sprag rollers being mounted within said shell.

8. A self-shifting transmission apparatus comprising:
    a rotational drive shaft and a rotational output spindle;
    a first transmission gear and a cylindrical output carrier on which said first transmission gear is attached;
    an overrunning clutch rotatable connected in series between said rotational drive shaft and said rotational output spindle;
    a centrifugal clutch rotatable connected in parallel with said first transmission gear and said overrunning clutch with said cylindrical output carrier being rotatably disposed about said centrifugal clutch and said overrunning clutch, said centrifugal clutch rotatable connected to a shaft which rotates in said overrunning clutch such that
    upon said rotational drive shaft rotating at and above a predetermined rotational speed, said centrifugal clutch engages to rotate said output spindle while rotating said shaft to overrun within said overrunning clutch; and
    upon said drive rotating below said predetermined rotational speed, said centrifugal clutch disengages thereby permitting said overrunning clutch to engage said shaft and rotate said output spindle through said first transmission gear.

9. The self-shifting transmission apparatus according to claim 8, wherein said centrifugal clutch comprises a cylindrical drum mounted between said shaft and said output spindle and at least one clutch shoe mounted within said cylindrical drum such that below said predetermined rotational speed said at least one clutch shoe rotates within said cylindrical drum and above said predetermined rotational speed said at least one clutch shoe extends radially outward and engages said cylindrical drum.

10. The self-shifting transmission apparatus according to claim 9, wherein said overrunning clutch comprises a drum shaft having a bore and an extended portion extending from said cylindrical drum journalled for rotation within said bore of said drum shaft.

11. The self-shifting transmission apparatus according to claim 10, wherein said extended portion further comprises a slip clutch which is configured to engage the bore of said drum shaft.

12. The self-shifting transmission apparatus according to claim 11, wherein said slip clutch comprises a metal strap spring disposed around said extended portion.

13. The self-shifting transmission apparatus according to claim 10, wherein said overrunning clutch further comprises a plurality of sprag rollers which engage and permit overrunning rotation of said drum shaft in one rotational direction.

14. The self-shifting transmission apparatus according to claim 13, wherein said overrunning clutch further comprises a shell located within and attached to said cylindrical output carrier, said plurality of sprag rollers being mounted within said shell.

15. The self-shifting transmission apparatus according to claim 13, further comprising a second transmission gear rotatably connected in series between said drum shaft and said rotational output spindle.

16. The self-shifting transmission apparatus according to claim 15, wherein said second transmission gear is a second planetary gearing set which is attached to and rotatably driven by said drum shaft and is attached to and drives said rotational output spindle.

* * * * *